UNITED STATES PATENT OFFICE.

LYMAN N. MIXER, OF HASTINGS, MICHIGAN.

IMPROVEMENT IN MEDICAL COMPOUNDS OR SIRUPS.

Specification forming part of Letters Patent No. 151,610, dated June 2, 1874; application filed March 14, 1874.

*To all whom it may concern:*

Be it known that I, LYMAN N. MIXER, of Hastings, in the State of Michigan, have invented a new and useful Medicinal Compound or Sirup, of which the following is a specification:

The medicinal liquid compound or sirup that I have invented, and which I term cancer or scrofula sirup, is made as follows: To one pound of sarsaparilla-root, I take licorice-root, three ounces; yellow-dock root, four ounces; senna leaves, two ounces; guaiac chips, two ounces. These ingredients, well crushed or ground and mixed together, are put in a suitable vessel (tin or copper) that can be closely covered. To them is added one gallon of soft water. The vessel containing the ingredients is then closed and placed in a heated water-bath, and its contents are allowed to simmer until reduced to about one-third of the original bulk or quantity. I then strain the contents of the vessel, and to the liquid I add two pounds of pure white sugar. The liquid is then scalded, and, after cooling, I add to it a half-pint of alcohol containing half a teaspoonful of oil of winter-green, one and a half ($1\frac{1}{2}$) ounce iodide of potassium. This is well mixed and stirred in until dissolved.

The sirup thus prepared should be bottled up tight for use. The winter-green is added for flavoring, and may be dispensed with.

Having described my invention, what I claim, and desire to secure by Letters Patent, is—

The herein-described liquid medicinal composition or sirup, consisting of the ingredients, in about the proportions, and compounded substantially as set forth.

In testimony whereof I have signed my name in the presence of two subscribing witnesses.

LYMAN N. MIXER.

Witnesses:
JAMES CLARKE,
WM. LINKE.